Patented May 9, 1933

1,907,975

UNITED STATES PATENT OFFICE

COULTER W. JONES, OF SHREVEPORT, LOUISIANA, ASSIGNOR TO JONES CHEMICAL COMPANY, OF McDADE, LOUISIANA, A CORPORATION OF LOUISIANA

RECOVERING IODINE

No Drawing. Application filed March 30, 1931. Serial No. 526,570.

The present invention relates to methods for recovering iodine from active charcoal or similar adsorbent medium whereon such iodine has been adsorbed in a general process for extracting the same from its aqueous solutions. The invention has particular regard to methods involving the lixiviation of the iodine-charged charcoal with an aqueous solution of a chemical reagent capable of converting the iodine into a soluble compound thereof.

Among the methods that are known for separating iodine from solutions of its compounds, one which has found commercial application to a certain extent consists in liberating the iodine in the elemental state by chlorinating or electrolyzing, contacting the solution of free iodine with a body of active charcoal or the equivalent to remove the iodine by adsorption thereon and finally recovering the iodine from the charcoal. It is with such last mentioned step that the present invention has more particularly to do.

Various methods have been tried or proposed for the chemical treatment of the iodine-charged charcoal to recover the iodine therefrom in a soluble combined form, such as by treating with an aqueous alkali metal hydroxide or carbonate solution, or with a sulphurous acid solution or a solution of a sulphite. All such chemical methods, however, suffer from certain disadvantages due to the difficulty of completely leaching out the soluble iodine compounds formed. In fact, it has not been found practical to extract more than about 60 to 70 per cent., and sometimes even less, of the iodine in the charcoal in this way, leaving the charcoal partially impregnated with non-volatile salts which impair its adsorptive capacity when reused. Furthermore, the aqueous solutions obtained from extracting the charcoal are more or less dilute, requiring evaporation to recover the dissolved salts therefrom, and such salts are a mixture of the desired iodide, containing some iodate when an alkali is used, together with more or less of an excess of the chemical reagent. The mixture so obtained requires extensive further treatment in order to prepare pure iodine or compound thereof.

I have found that the foregoing disadvantages and difficulties are to a large degree, if not completely, avoided or overcome when ammonia is employed as the chemical reagent for extracting the iodine from iodine-charged charcoal or equivalent medium. To the accomplishment of the result thus mentioned the invention, then, consists of the steps hereinafter fully described and particularly pointed out in the claims, the following description setting forth in detail various ways in which the principle of the invention may be used.

The treatment of iodine-charged charcoal or the like may be effected either with anhydrous or aqueous ammonia, and also either in vapor or liquid phase. For example, such charcoal may be extracted with liquid ammonia or with aqueous ammonium hydroxide solution; or it may first be treated with ammonia vapor and then extracted with water; or, again, the charcoal may be treated with ammonia vapor and steam simultaneously to convert the iodine to ammonium iodide and volatilize the latter from the charcoal.

In whatever manner carried out, however, certain distinct advantages attach to the treatment with ammonia in preference to alkali metal or other metallic compounds, viz.: (1) the iodine is converted entirely to ammonium iodide instead of a mixture of iodide and iodate, as is the case when an alkali metal hydroxide or carbonate is used; (2) no salts other than ammonium iodide are formed, while, when a solution of a sulphite, for instance, is used for the extraction, the corresponding sulphate is formed together with the desired iodide; (3) any excess of ammonia employed is easily separated from the iodide product by vaporizing and does not remain in it; (4) using the same volume of water, a materially higher extraction of iodine from the charcoal, as ammonium iodide, is possible than when any of the other aqueous reagents mentioned are employed; (5) the aqueous solution of ammonium iodide obtained can be evaporated, either with or without previous treatment with an alkali, to crystallize out directly the corresponding iodide free from any other salts, whereas with the other reagents referred to the iodide product is accompanied either by iodate, sulphate or other non-volatile compound, as well as with any excess of reagent employed, requiring a more or less complicated purification treatment to prepare a pure iodide product; (6) the charcoal after treatment contains no residue of non-volatile salts to reduce its adsorptive capacity, but may be purified from any possible residue of ammonium compounds simply by heating or steaming out, whereby the original activity of the charcoal may be preserved substantially unimpaired, even after long continued and repeated use.

The following examples illustrate a few of the various ways in which my improved method may be carried out, but no limitation of the scope of the invention is implied thereby other than as hereinafter expressly provided in the claims.

Example 1

A body of cocoanut charcoal saturated with iodine, containing approximately 9.2 grams iodine per 10 grams charcoal, was heated in a current of dry ammonia gas at a temperature of about 300° C. for 1 hour, whereby the iodine was converted to ammonium iodide without material volatilization of the latter. Upon leaching the charcoal with water at room temperature 87 per cent of the original iodine content was obtained in the solution as ammonium iodide, and an additional 6 per cent thereof as free iodine dissolved in the iodide solution, making a total extraction of 93 per cent. Similarly, after heating at 270° C. for 1 hour, 85 per cent of the total iodine was recovered; and after heating at 75° C. for 1 hour, a 46.5 per cent recovery was had.

When utilizing the foregoing general procedure, the ammonia gas current may be continuously recirculated. Any temperature between room temperature and 500° C. may be employed for the treatment with ammonia gas, a longer time naturally being required at lower temperatures than at higher temperatures for complete conversion of iodine to ammonium iodide. Above about 500° C. dissociation or decomposition of ammonium iodide commences. The extraction with water may be carried out at ordinary temperature, although moderate warming may be of some advantage.

Example 2

By heating the iodine-charged charcoal at a moderately elevated temperature by contact with a current of ammonia gas mixed with superheated steam, substantially all of the iodine may be converted to ammonium iodide and the latter volatilized out of the charcoal, being recovered from the aqueous condensate. A temperature of approximately 300° C. has been found satisfactory, although somewhat higher or lower temperatures may also be employed. It is preferable to have an excess of ammonia over steam present, in order to prevent volatilization of uncombined iodine along with the ammonium iodide.

Example 3

A quantity of 19.2 grams of iodine-charged charcoal similar to that used in Example 1 was introduced directly into an excess (200 cubic centimeters) of concentrated ammonium hydroxide solution at room temperature and the mixture allowed to stand for about 1 hour with slight stirring. The aqueous solution was then drained from the charcoal, such solution containing 84 per cent of the total iodine in the charcoal dissolved as ammonium iodide. By washing with an equal volume of wash water an additional 14 per cent of the iodine was recovered as ammonium iodide, the total recovery being 98 per cent.

A more dilute ammonium hydroxide, i. e. containing as low as 1.5 per cent $NH_3$, may be employed for treatment of the iodine-charged charcoal, but in general stronger solutions are to be preferred to avoid unnecessary dilution of the iodide solution obtained. In general an excess of ammonia is to be employed, the excess being recovered from the solution of ammonium iodide when the latter is concentrated for crystallizing the salt. The solution may be evaporated directly to crystallize ammonium iodide, or it may be treated with sufficient alkali metal hydroxide or carbonate to decompose the ammonium salt and form the corresponding alkali metal iodide, after which crystallization of the latter may be effected in the usual way and the liberated ammonia recovered for reuse. No fractional crystallization or separation of other salts is involved, the desired iodide being obtained directly in substantially pure form and in high yield, without the accompaniment of more or less impure mother liquors requiring further treatment.

I have found that under parallel conditions, using ammonium hydroxide and sodium hydroxide, respectively, to lixiviate the iodine-charged charcoal, a higher extraction of iodine is obtained for a given volume of solution with ammonium hydroxide than with sodium hydroxide, the ratio being apparently in the proportion of about 70/64. Under such conditions, moreover, extraction with ammonium hydroxide yields ammonium iodide alone, according to the equation;

$$3I_2 + 8NH_4OH \rightarrow 6NH_4I + N_2 + 8H_2O$$

whereas with sodium hydroxide both iodide and iodate are formed, according to the equation;

$$3I_2 + 6NaOH \rightarrow 5NaI + NaIO_3 + 3H_2O$$

The practical utility of the hereindescribed improved method of recovering iodine from iodine-charged charcoal is most closely associated with a complete method for the recovery of iodine from natural waters or solutions containing the same. For instance, certain natural brines which contain a small amount of iodine in the form of iodide may be processed approximately as follows, viz.: (1) the brine is acidified, preferably to about the degree of acidity expressed at $p_H = 3$; (2) the acidified brine is treated with chlorine in amount equivalent to the iodine content thereof to liberate the latter in the elemental state; (3) the solution of free iodine is intimately contacted with a body of activated carbon or charcoal so as to remove the iodine therefrom by adsorption upon such carbon or charcoal; (4) the iodine-charged charcoal is treated with aqueous ammonia in accordance with the hereindescribed method to form a solution of ammonium iodide and (5) the aqueous ammonium iodide solution is subjected to appropriate treatment to yield any desired iodide. Proceeding in this way a high recovery of the iodine content of the original brine is realized, yielding a substantially pure iodide with fewer steps than when any of the previously known methods is employed.

The principle of the invention is equally applicable to the recovery of iodine from other adsorbent media, such as silica gel or similar metallic oxide gels, and the like.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of recovering iodine from an adsorbent medium containing the same, the steps which consist in treating such iodine-containing medium with ammonia to form ammonium iodide and recovering the ammonium iodide from said medium.

2. In a method of recovering iodine adsorbed on active charcoal or the like, the steps which consists in treating such iodine-containing charcoal with ammonia to form ammonium iodide and recovering the ammonium iodide from said medium.

3. In a method of recovering iodine adsorbed on active charcoal or the like, the steps which consist in lixiviating such iodine-containing charcoal with aqueous ammonium hydroxide solution, separating the charcoal from the solution containing ammonium iodide and recovering an iodide from such solution.

Signed by me this 24 day of March 1931.
COULTER W. JONES.